US012545856B2

(12) United States Patent
Grainger et al.

(10) Patent No.: US 12,545,856 B2
(45) **Date of Patent: *Feb. 10, 2026**

(54) DETERGENT COMPOSITIONS COMPRISING SECONDARY ALKANE SULTANATE, A SECOND ANIONIC SURFACTANT, AND ALKYL HYDROXYSULTAINE COSURFACTANT

(71) Applicant: Conopco, Inc., Englewood Cliffs, NJ (US)

(72) Inventors: David Stephen Grainger, Chester (GB); Uyai Ikpatt, Prenton (GB); Paul Simon Stevenson, Liverpool (GB); David Christopher Thorley, Shavington (GB)

(73) Assignee: Conopco, Inc., Englewood Cliffs, NJ (US)

( * ) Notice: Subject to any disclaimer, the term of this patent is extended or adjusted under 35 U.S.C. 154(b) by 184 days.

This patent is subject to a terminal disclaimer.

(21) Appl. No.: 18/020,133

(22) PCT Filed: Aug. 10, 2021

(86) PCT No.: PCT/EP2021/072221

§ 371 (c)(1),
(2) Date: Feb. 7, 2023

(87) PCT Pub. No.: WO2022/043045

PCT Pub. Date: Mar. 3, 2022

(65) Prior Publication Data

US 2023/0303951 A1 Sep. 28, 2023

(30) Foreign Application Priority Data

Aug. 28, 2020 (EP) .................................... 20193306

(51) Int. Cl.

| | |
|---|---|
| ***C11D 1/12*** | (2006.01) |
| ***B08B 3/04*** | (2006.01) |
| ***C11D 1/14*** | (2006.01) |
| ***C11D 1/72*** | (2006.01) |
| ***C11D 1/88*** | (2006.01) |
| ***C11D 1/92*** | (2006.01) |
| ***C11D 1/94*** | (2006.01) |
| ***C11D 3/00*** | (2006.01) |
| ***C11D 3/37*** | (2006.01) |
| ***C11D 3/386*** | (2006.01) |
| *C11D 1/22* | (2006.01) |
| *C11D 1/26* | (2006.01) |
| *C11D 1/66* | (2006.01) |
| *C11D 1/755* | (2006.01) |

(52) U.S. Cl.

CPC .............. *C11D 1/94* (2013.01); *C11D 3/0036* (2013.01); *C11D 3/3715* (2013.01); *C11D 3/3723* (2013.01); *C11D 1/143* (2013.01); *C11D 1/146* (2013.01); *C11D 1/22* (2013.01); *C11D 1/26* (2013.01); *C11D 1/662* (2013.01); *C11D 1/755* (2013.01); *C11D 1/92* (2013.01); *C11D 2111/12* (2024.01)

(58) Field of Classification Search

CPC ....... C11D 1/94; C11D 3/0036; C11D 3/3715; C11D 3/3723; C11D 2111/12; C11D 1/143; C11D 1/146; C11D 1/22; C11D 1/92; C11D 3/386; C11D 1/12; C11D 1/14; C11D 1/72; C11D 1/88; C11D 3/37; B08B 3/04

See application file for complete search history.

(56) References Cited

U.S. PATENT DOCUMENTS

| | | | |
|---|---|---|---|
| 2,324,199 | A | 7/1943 | Datin et al. |
| 3,332,880 | A | 7/1967 | Kessler et al. |
| 3,650,962 | A | 3/1972 | Werdehausen et al. |
| 3,963,499 | A | 6/1976 | Shiba et al. |
| 4,153,570 | A | 5/1979 | Hennemann et al. |
| 4,435,307 | A | 3/1984 | Barbesgaard et al. |
| 4,760,025 | A | 7/1988 | Estell et al. |
| 5,427,936 | A | 6/1995 | Moeller et al. |
| 5,648,263 | A | 7/1997 | Schülein et al. |
| 5,679,630 | A | 10/1997 | Baeck et al. |
| 5,691,178 | A | 11/1997 | Schülein et al. |

(Continued)

FOREIGN PATENT DOCUMENTS

| | | | |
|---|---|---|---|
| CN | 1039803 | A | 2/1990 |
| CN | 1061240 | A | 5/1992 |

(Continued)

OTHER PUBLICATIONS

Dartois, V., et al.; "Cloning, nucleotide sequence and expression in *Escherichia coli* of a lipase gene from Bacillus subtilis 168"; Biochimica et Biophysica Acta; 1131, pp. 253-260 (1992).
Search Report and Written Opinion in EP20193306.6; Dec. 23, 2021.
Search Report and Written Opinion in EP20193480; Mar. 12, 2021.
Quack J. M., et al.; Sekundäre Alkansulfonate Entwicklungen auf dem Gebiet der sekundären Alkansulfonate; XP001390743; Tenside Detergents, vol. 22, No. 6 (1985).
Barakat Y., et al.,; "The Phase Behavior of Simple Salt-Tolerant Sulfonates"; XP055778374; Society of Petroleum Engineers Journal, vol. 23, No. 6 (1983).

(Continued)

*Primary Examiner* — Brian P Mruk

(74) *Attorney, Agent, or Firm* — Carter, DeLuca & Farrell, LLP; George Likourezos; Bret P. Shapiro

(57) ABSTRACT

A detergent composition that includes from 1 to 40 wt. % of a secondary alkane sulfonate surfactant with an average of 15 to 18 carbon atoms in a linear alkane chain, from 1 to 40 wt. % of an anionic surfactant other than the secondary alkane sulfonate surfactant, and from 0.01 to 8% of an alkyl hydroxysultaine co-surfactant. Greater than 50 wt. % of the alkyl chain of the secondary alkane sulfonate is C15 to C18 secondary alkane sulfonate.

19 Claims, No Drawings

(56) References Cited

U.S. PATENT DOCUMENTS

| | | | | |
|---|---|---|---|---|
| 5,776,757 | A | 7/1998 | Schülein et al. | |
| 5,827,718 | A | 10/1998 | Ishida et al. | |
| 5,942,431 | A | 8/1999 | Yoneda et al. | |
| 5,998,355 | A | 12/1999 | Brumbaugh | |
| 6,172,024 | B1 * | 1/2001 | Arvanitidou | C11D 3/1213 510/237 |
| 6,312,936 | B1 | 11/2001 | Poulose et al. | |
| 6,495,357 | B1 | 12/2002 | Fuglsang et al. | |
| 6,514,927 | B2 | 2/2003 | Lang et al. | |
| 6,821,939 | B1 | 11/2004 | Szewczyk et al. | |
| 7,262,042 | B2 | 8/2007 | Weber et al. | |
| 8,353,663 | B2 | 1/2013 | Arzel et al. | |
| 2001/0031712 | A1 | 10/2001 | Ziganke et al. | |
| 2003/0139317 | A1 | 7/2003 | Behler et al. | |
| 2003/0171247 | A1 | 9/2003 | Meine et al. | |
| 2005/0096249 | A1 | 5/2005 | Jonas et al. | |
| 2008/0105847 | A1 | 5/2008 | Lang | |
| 2009/0048137 | A1 * | 2/2009 | Lang | C11D 3/3773 510/341 |
| 2012/0070388 | A1 * | 3/2012 | Man | D06L 1/12 508/501 |
| 2012/0214724 | A1 * | 8/2012 | Scheibel | A61Q 19/10 510/447 |
| 2013/0072414 | A1 * | 3/2013 | Price | C11D 1/86 510/447 |
| 2014/0080748 | A1 | 3/2014 | Price et al. | |
| 2014/0116690 | A1 | 5/2014 | Bittner et al. | |
| 2015/0203798 | A1 | 7/2015 | Miracle et al. | |
| 2015/0218491 | A1 | 8/2015 | Morschhaeuser et al. | |
| 2017/0066998 | A1 | 3/2017 | Holland et al. | |
| 2017/0321160 | A1 | 11/2017 | Lant et al. | |
| 2017/0369816 | A1 | 12/2017 | Holland et al. | |
| 2019/0112548 | A1 | 4/2019 | Pegelow et al. | |

FOREIGN PATENT DOCUMENTS

| | | | |
|---|---|---|---|
| CN | 1207760 | A | 2/1999 |
| CN | 103347928 | A | 10/2013 |
| CN | 103380107 | A | 10/2013 |
| CN | 103725447 | A | 4/2014 |
| CN | 106281771 | | 1/2017 |
| CN | 106574209 | A | 4/2017 |
| CN | 107406805 | A | 11/2017 |
| CN | 110914397 | A | 3/2020 |
| CN | 116096845 | A | 5/2023 |
| DE | 2613790 | A1 | 10/1976 |
| DE | 2800519 | A1 | 7/1978 |
| DE | 4236698 | | 5/1994 |
| DE | 19928923 | | 12/2000 |
| DE | 102007030109 | | 1/2009 |
| DE | 102007032110 | | 1/2009 |
| EP | 0218272 | | 4/1987 |
| EP | 0258068 | | 3/1988 |
| EP | 0305216 | | 3/1989 |
| EP | 0331376 | | 9/1989 |
| EP | 0351928 | | 1/1990 |
| EP | 0407225 | | 1/1991 |
| EP | 0260105 | | 5/1994 |
| EP | 1236793 | A2 | 9/2002 |
| EP | 3162872 | | 5/2017 |
| FR | 1472561 | | 3/1967 |
| GB | 987795 | | 3/1965 |
| GB | 1010588 | | 11/1965 |
| GB | 1041189 | | 9/1966 |
| GB | 1296839 | | 11/1972 |
| GB | 1372034 | | 10/1974 |
| GB | 1451228 | | 9/1976 |
| GB | 1494760 | | 12/1977 |
| GB | 2332443 | | 6/1999 |
| RU | 2108372 | C1 | 4/1998 |
| WO | WO8906270 | | 7/1989 |
| WO | WO8906279 | | 7/1989 |
| WO | WO8909259 | | 10/1989 |
| WO | WO9116422 | | 10/1991 |
| WO | 9206161 | A1 | 4/1992 |
| WO | WO9205249 | | 4/1992 |
| WO | WO9219708 | | 11/1992 |
| WO | WO9219709 | | 11/1992 |
| WO | WO9318140 | | 9/1993 |
| WO | WO9324618 | | 12/1993 |
| WO | WO9401541 | | 1/1994 |
| WO | WO9425578 | | 11/1994 |
| WO | WO9425583 | | 11/1994 |
| WO | WO9506720 | | 3/1995 |
| WO | WO9510602 | | 4/1995 |
| WO | WO9514783 | | 6/1995 |
| WO | WO9522615 | | 8/1995 |
| WO | WO9526397 | | 10/1995 |
| WO | WO9530744 | | 11/1995 |
| WO | WO06045275 | | 12/1995 |
| WO | WO9535381 | | 12/1995 |
| WO | WO9600292 | | 1/1996 |
| WO | WO9612012 | | 4/1996 |
| WO | WO9613580 | | 5/1996 |
| WO | WO9627002 | | 9/1996 |
| WO | WO9629397 | | 9/1996 |
| WO | WO9704079 | | 2/1997 |
| WO | WO9707202 | | 2/1997 |
| WO | 9718284 | A2 | 5/1997 |
| WO | WO9812307 | | 3/1998 |
| WO | WO9815257 | | 4/1998 |
| WO | 9835002 | A1 | 8/1998 |
| WO | WO0060060 | | 10/2000 |
| WO | WO0060063 | | 10/2000 |
| WO | WO0116285 | | 3/2001 |
| WO | WO0157170 | | 3/2001 |
| WO | 0155290 | A1 | 8/2001 |
| WO | WO0216547 | | 2/2002 |
| WO | 0222770 | A1 | 3/2002 |
| WO | WO02026024 | | 4/2002 |
| WO | WO2005003274 | | 1/2005 |
| WO | 2005014764 | A1 | 2/2005 |
| WO | WO2005040372 | | 5/2005 |
| WO | WO2005052146 | | 6/2005 |
| WO | WO2005052161 | | 6/2005 |
| WO | WO2006027086 | | 3/2006 |
| WO | WO2006032327 | | 3/2006 |
| WO | WO2006032397 | | 3/2006 |
| WO | WO2007147866 | | 12/2007 |
| WO | WO2008017570 | | 2/2008 |
| WO | WO2008087497 | | 7/2008 |
| WO | WO2008141880 | | 11/2008 |
| WO | 2009007166 | A1 | 1/2009 |
| WO | WO09021867 | | 2/2009 |
| WO | WO2009087524 | | 7/2009 |
| WO | WO2009090576 | | 7/2009 |
| WO | WO2009107091 | | 9/2009 |
| WO | WO2009111258 | | 9/2009 |
| WO | WO2009132870 | | 11/2009 |
| WO | WO2009141173 | | 11/2009 |
| WO | WO2009148983 | | 12/2009 |
| WO | WO2010102861 | | 9/2010 |
| WO | WO2010148624 | | 12/2010 |
| WO | WO2010151906 | | 12/2010 |
| WO | WO2011011799 | | 1/2011 |
| WO | WO2012054820 | | 4/2012 |
| WO | 2012104159 | A1 | 8/2012 |
| WO | 2012112828 | A1 | 8/2012 |
| WO | WO2013142495 | | 9/2013 |
| WO | WO2013151970 | | 10/2013 |
| WO | WO2014029479 | | 2/2014 |
| WO | WVO2015084813 | | 6/2015 |
| WO | WO2015191434 | | 12/2015 |
| WO | WO2016005338 | | 1/2016 |
| WO | WO2012054058 | | 4/2016 |
| WO | 2016111884 | A2 | 7/2016 |
| WO | WO2016206837 | | 12/2016 |
| WO | 2017030996 | A1 | 2/2017 |
| WO | WO2017079718 | | 5/2017 |
| WO | WVO2017079719 | | 5/2017 |
| WO | WO2017216216 | | 12/2017 |
| WO | WO2018085311 | | 5/2018 |
| WO | 2018206202 | A1 | 11/2018 |

(56) References Cited

FOREIGN PATENT DOCUMENTS

| | | |
|---|---|---|
| WO | WO2019008036 | 1/2019 |
| WO | WVO2019007636 | 1/2019 |
| WO | WO2019075149 | 4/2019 |
| WO | WO2020016097 | 1/2020 |
| WO | WO2020058088 | 3/2020 |
| WO | WO2020229158 | 11/2020 |
| WO | 2022042977 A1 | 3/2022 |

OTHER PUBLICATIONS

Search Report and Written Opinion in EP20193438; Mar. 9, 2021.
Sobisch, T.; "Solubilisation in wäBrigen Lösungen von Tensidmischungen"; Tenside Surfactants Detergents; ; vol. 31, No. 1, pp. 36-38 (1994) (with machine transalation).
Search Report and Written Opinion in EP20193390.0; Mar. 3, 2021.
Search Report and Written Opinion in EP20193319; Feb.26, 2021.
Domsch, A., et al., "Untersuchungen zur Waschwirkung amphoterer Tenside as Zusatze als Flüssigwaschmitteln"; SOFW Journal; 119 (2), pp. 333-334, 337, 338 (1993).
Search Report and Written Opinion in PCT/EP2021/072221; Dec. 6, 2021; World Intellectual Property Org. (WIPO).
International Preliminary Report on Patentability in PCT/EP2021/070963; Dec. 22, 2022; World Intellectual Property Org. (WIPO).
Siezen R.J., et al.,; "Homology modelling and protein engineering strategy of subtilases, the family of subtilisin-like serine proteinases"; Protein Engineering, Design and Selection, 4(7), pp. 719-737 (1991).
Siezen, R.J., et al.,; "Subtilases: the superfamily of subtilisin like serine proteases"; Protein Sciences, 6(3), pp. 501-523 (1997).
Douvartzides S.L,. et al.,; "Green Diesel: Biomass Feedstocks, Production Technologies, Catalytic Research, Fuel Properties and Performance in Compression Ignition Internal Combustion Engines"; Energies, 12(5) p. 809 (2019).
"HERA: Human & Environment Risk Assessment on ingredients of household cleaning products"; vol. 1pp. 1-79 (2005).
Biao Zhang et al., "Development of application of surfactants in household detergent", Applied Chemical Industry; vol. 37, pp. 1-15, Feb. 2008, with English translation.
Masri et al. "A sustainable, high-performance process for the economic production of waste-free microbial oils that can replace plant-based equivalents," Energy & Environmental Science, Jun. 2019 pp. 2717-2732, 12, Royal Society of Chemistry.
Saad et al, "Algal Biofuels: Current Status and Key Challenges," Energies, May 2019, pp. 1-22; 12, 1920, MDPI.
International Preliminary Report on Patentability issued in International Patent Application No. PCT/EP2021/072221 dated Mar. 9, 2023.
International Search Report and Written Opinion issued in International Patent Application No. PCT/EP2021/070963 dated Nov. 16, 2021.
International Search Report and Written Opinion issued in International Patent Application No. PCT/EP2021/070963 dated Jul. 25, 2022.
International Search Report and Written Opinion issued in International Patent Application No. PCT/EP2021/072186 dated Nov. 24, 2021.
International Preliminary Report on Patentability issued in International Patent Application No. PCT/EP2021/072186 dated Mar. 9, 2023.
International Search Report and Written Opinion issued in International Patent Application No. PCT/EP2021/072855 dated Dec. 22, 2021.
International Preliminary Report on Patentability issued in International Patent Application No. PCT/EP2021/072855 dated Mar. 9, 2023.
International Search Report and Written Opinion issued in International Patent Application No. PCT/EP2021/071243 dated Nov. 18, 2021.
International Preliminary Report on Patentability issued in International Patent Application No. PCT/EP2021/071243 dated Aug. 3, 2022.
Baena-Nogueras, et al., "Reactivity and fate of secondary alkane sulfonates (SAS) in marine sediments", Elsevier, Environmental Pollution, Feb. 2014, pp. 35-42, vol. 189.
Park et al., "Tunable Oleo-Furan Surfactants by Acylation of Renewable Furans", ACS Central Science, Oct. 2016, pp. 820-824, vol. 2.
Smulders, "Laundry Detergents", Laundry Detergents, Wiley-VCH, 2002, pp. 39-40, 88-90.

* cited by examiner

DETERGENT COMPOSITIONS COMPRISING SECONDARY ALKANE SULTANATE, A SECOND ANIONIC SURFACTANT, AND ALKYL HYDROXYSULTAINE COSURFACTANT

FIELD OF INVENTION

The present invention concerns a detergent composition. More particularly a detergent composition comprising secondary alkane sulfonate (SAS) surfactant with an average of 15 to 18 carbon atoms in a linear alkane chain along with a second anionic surfactant and an alkyl hydroxysultaine cosurfactant.

BACKGROUND OF THE INVENTION

Surfactants comprise an oil soluble hydrocarbon chain with a water solubilising group attached to it. Detergent compositions comprise surfactants to remove soils from substrates. For example, laundry detergents contain surfactants to remove soils from clothing during washing. Many typical detergents contain a mix of anionic and non-ionic surfactants with predominately C12 hydrocarbon chains.

SAS is well known as a surfactant in the prior art and has been used for a number of years in laundry and household care applications. SAS is advantageous because of its relatively simple structure that makes it easy to source from non-petrochemical feedstocks. It does not require the use of hazardous feedstocks such as benzene or ethylene oxide. Furthermore, it does not depend on green feedstocks that are limited in terms of their availability at scale (e.g. palm kernel oil or coconut oil).

SAS is atypical of many typical deterging surfactants because it is based on longer (C14-17) alkyl chain hydrophobes. This means it can be sourced from a number of green/natural feedstocks which are not dependent on palm crops, especially palm kernel oil. Nevertheless, it still provides a good cleaning performance, excellent foaming properties and is an excellent material for use in laundry products. It may be utilised with a second anionic surfactant for improved product characteristics.

There is however a need to improve detergent compositions containing SAS and anionic surfactants. A problem that exists is to find a surfactant system that provides improved cleaning. A particular problem is to improve cleaning for solid or semi-solid fatty stains (such as beef fat), particularly at low temperature.

Surprisingly, this problem can be solved by the combination of a secondary alkane sulfonate (SAS) surfactant with an average of 15 to 18 carbon atoms in a linear alkane chain along with a second anionic surfactant and an alkyl hydroxysultaine cosurfactant.

SUMMARY OF THE INVENTION

The invention relates to a detergent composition comprising:

a) from 1 to 40 wt. %, preferably from 2 to 30 wt. %, most preferably from 3 to 15 wt. %, of a secondary alkane sulfonate surfactant with an average of 15 to 18 carbon atoms in a linear alkane chain;

b) from 1 to 40 wt. %, preferably from 2 to 30 wt. %, most preferably from 3 to 15 wt. %, of an anionic surfactant other than a); and, c) from 0.01 to 8%, preferably from 0.1 to 6 wt. %, more preferably from 0.25 wt. % to 5 wt. %, most preferably from 0.5 to 5 wt. % of an alkyl hydroxysultaine co-surfactant; and, and, wherein greater than 50 wt. % of the alkyl chain of the secondary alkane sulfonate is C15 to C18, preferably C15 to C17 secondary alkane sulfonate.

Preferably greater than 60 wt. %, more preferably greater than 70 wt. %, more preferably at least 75 wt. %, more preferably at least 80 wt. %, even more preferably at least 85 wt. %, even more preferably at least 90 wt. %, most preferably at least 95 wt. % of the alkyl chain of the secondary alkane sulfonate is C15 to C18, preferably C15 to C17 secondary alkane sulfonate.

Preferably the alkyl chains of the secondary alkane sulfonate are obtained from renewable sources, preferably from triglycerides.

Preferably the total weight ratio of SAS surfactants (a) to the other anionic surfactant (b) ranges from 10:1 to 1:10, more preferably from 5:1 to 1:5, even more preferably from 4:1 to 1:4, most preferably 3:1 to 1:3.

Preferably the weight ratio of anionic surfactants [(a)+(b)] to cosurfactant (c) ranges from 2:1 to 100:1, preferably from 4:1 to 50:1, most preferably from 5:1 to 20:1.

Preferably the hydroxysultaine surfactant has greater than 50 wt. %, preferably greater than 60 wt. %, more preferably greater than 70 wt. %, more preferably at least 75 wt. %, more preferably at least 80 wt. % of the alkyl chain of the hydroxysultaine surfactant has an alkyl chain of from C10-C16.

Preferably (b), the anionic surfactant other than a) (the secondary alkane sulfonate surfactant) is selected from primary alkyl sulfates, linear alkyl benzene sulfonates, alkyl ether sulfates, internal olefin sulfonates, alpha olefin sulfonates, soaps, anionically modified APGs, furan based anionics, anionic biosurfactants (e.g. rhamnolipids that have carboxylate functionality), and, citrems, tatems and datems, more preferably selected from primary alkyl sulfates, linear alkyl benzene sulfonates, alkyl ether sulfates, furan based anionics, and rhamnolipids.

Preferably, the composition comprises from 0.5 to 20 wt. %, more preferably from 1 to 16 wt. %, even more preferably from 1.5 to 12 wt. %, most preferably from 2 to 10 wt. % of nonionic surfactants. Preferred nonionic surfactants are preferably selected from alcohol ethoxylates having from C12-C15 with a mole average of from 5 to 9 ethoxylates and/or alcohol ethoxylates having from C16-C18 with a mole average of from 7 to 14 ethoxylates.

Preferably the composition comprises from 0.5 to 15 wt. %, more preferably from 0.75 to 15 wt. %, even more preferably from 1 to 12 wt. %, most preferably from 1.5 to 10 wt. % of cleaning boosters selected from antiredeposition polymers, soil release polymers, alkoxylated polycarboxylic acid esters and mixtures thereof.

Preferably the antiredeposition polymers are alkoxylated polyamines; and/or the soil release polymer is a polyester soil release polymer.

Preferably the detergent composition is a laundry detergent composition, more preferably a laundry liquid detergent composition, or a liquid unit dose detergent composition.

Preferably the composition comprises one or more enzymes from the group: lipases proteases, alpha-amylases, cellulases, peroxidases/oxidases, pectate lyases, and mannanases, or mixtures thereof, more preferably lipases, proteases, alpha-amylases, cellulases and mixtures thereof, wherein the level of each enzyme in the composition of the invention is from 0.0001 wt. % to 0.1 wt. %.

In a second aspect the invention provides a method, preferably a domestic method, of treating a textile, the method comprising the step of: treating a textile with an aqueous solution of 0.5 to 20 g/L of the detergent composition, preferably the laundry liquid detergent composition, of the first aspect.

Preferably in the method the aqueous solution contains 0.1 to 1.0 g/L of the surfactants of (a) and (b).

The method, preferably a domestic method taking place in the home using domestic appliances, preferably occurs at wash water temperatures of 280 to 335K. The textile is preferable soiled with sebum arising from contact with human skin.

DETAILED DESCRIPTION OF THE INVENTION

The indefinite article "a" or "an" and its corresponding definite article "the" as used herein means at least one, or one or more, unless specified otherwise.

All enzyme levels refer to pure protein.

wt. % relates to the amount by weight of the ingredient based on the total weight of the composition. For charged surfactants (for example anionic surfactants), wt. % is calculated based on the protonated form of the surfactant.

The formulation may be in any form for example a liquid, solid, powder, liquid unit dose. Preferably the composition is a liquid detergent composition or a liquid unit dose detergent composition.

The formulation when dissolved in demineralised water at 20° C. preferably has a pH of 3 to 10, more preferably from 4 to 9, more preferably 5 to 7.5, most preferably 7.

The integers 'q' are mole average values.

Preferably the weight ratio of the total amount of anionic surfactants to the total amount of nonionic surfactants (if present) ranges from 4:1 to 1:4, preferably from 2:1 to 1:2, most preferably 1.5:1 to 1:1.5.

Secondary Alkane Sulfonate (SAS)

Secondary alkane sulfonates (SAS) of the invention are of the formula:—

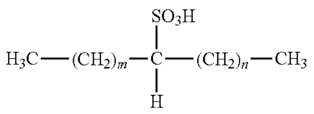

where n+m=12 to 15, with an average chain length of 15 to 18; preferably n+m=12 to 14, with a mole average chain length of 15 to 17.

Secondary alkane sulfonates (SAS) are described in HERA document Secondary Alkane Sulfonate Version 1 April 2005, in Anionic Surfactants Organic Chemistry edited by H. W. Stache (Surfactant Science Series vol 56, Marcel Dekker 1996) and references therein.

Secondary alkane sulfonate may be produced by reacting linear paraffins with sulfur dioxide and oxygen in the presence of water whilst irradiating with ultraviolet light. Secondary alkane sulfonates (SAS) obtained from sulfoxidation are a mixture of closely related isomers and homologues of secondary alkane sulfonate sodium salts. The content of primary alkane sulfonates is <1%. The sulfoxidation in the presence of UV light and water results in a mixture of about 90% mono- and 10% disulfonic acids.

The linear paraffins feedstock may be obtained from triglyceride by catalytic hydrotreating as described in *Energies* 2019, 12, 809 *Green Diesel: Biomass Feedstocks, Production Technologies, Catalytic Research, Fuel Properties and Performance in Compression Ignition Internal Combustion Engines* by S. L. Douvartzides et al.

Hydrotreating involve hydrogenation and decarboxylation, decarbonylation, or hydrodeoxygenation reactions, preferably decarboxylation.

The hydrotreating process can reduce the carbon chain length by 1 unit, depending on the hydrotreating process that is used. The decarboxylation and decarbonylation reactions will typically reduce the carbon chain length by 1 unit, for example:

R—COOH→R—H decarboxylation, where R is alkyl

In this manner the secondary alkane sulfonate is produced from the alkyl chain of predominately C16 to C18 fatty acids from natural triglycerides, but with loss of 1 carbon to give predominately C15 to C17 linear paraffins. Preferably the secondary alkane sulfonate is more than 80 wt. % composed of C15 and C17 chains.

The weight % of the SAS are calculated as the protonated species.

Preferably the alkyl chains of the secondary alkane sulfonate are obtained from renewable sources, preferably from triglycerides.

Other Anionic Surfactant

The composition comprises from 1 to 40 wt. %, preferably from 2 to 30 wt. %, most preferably from 3 to 15 wt. % of one or more anionic surfactants other than (a) the secondary alkane sulfonate surfactant with an average of 15 to 17 carbon atoms in a linear alkane chain.

Other preferred anionic surfactants include primary alkyl sulfates, preferably a $C_{10}$-$C_{20}$ alkyl sulfate, preferably a lauryl sulfate. The primary alkyl sulfate preferably is in the form with a counterion, more preferably the counterion is a sodium, potassium or ammonium ion. Examples of preferred materials include sodium $C_{10}$-$C_{20}$ alkyl sulfate, most preferably sodium lauryl sulfate.

Other preferred anionic surfactants include linear alkylbenzene sulfonates. Linear alkyl benzene sulfonate is the neutralised form of linear alkyl benzene sulfonic acid. Neutralisation may be carried out with any suitable base.

Linear alkyl benzene sulfonic acid has the structure:

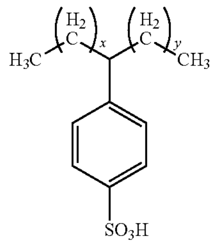

where x+y=7, 8, 9 or 10. Preferably x+y=8 is present at greater than 28 wt. % of the total LAS. Preferably x+y=9 is present at greater than 28 wt. % of the total LAS. Weights are expressed as the protonated form. It may be produced by a variety of different routes.

Synthesis is discussed in Anionic Surfactants Organic Chemistry edited by H. W. Stache (Marcel Dekker, New York 1996). Linear alkyl benzene sulfonic acid may be made by the sulfonation of Linear alkyl benzene. The sulfation can be carried out with concentrated sulphuric acid, oleum or sulphur trioxide. Linear alkyl benzene sulfonic acid produced by reaction of linear alkyl benzene with sulphur trioxide is preferred.

Linear alkyl benzene may be produced by a variety of routes. Benzene may be alkylated with n-alkenes using HF catalyst. Benzene may be alkylated with n-alkenes in a fixed bed reactor with a solid acidic catalyst such as alumosilicate (DETAL process). Benzene may be alkylated with n-alkenes using an aluminium chloride catalyst. Benzene may be alkylated with n-chloroparaffins using an aluminium chloride catalyst.

Other preferred anionic surfactants include the alkyl ether sulfate surfactants of formula:

$$RO(CH_2CH_2O)_qSO_3M$$

wherein R is an saturated or monunsaturated $C_{10}$-$C_{18}$ linear alkyl chain, q is a mole average ethoxylation of from 0.5 to 16, and M is a cation which can be, for example, a metal cation (e.g., sodium, potassium, lithium, calcium, magnesium, etc.), ammonium or substituted-ammonium cation.

Preferred alkyl ether sulfate surfactants include where R is a $C_{12}$-$C_{15}$ alkyl chain, most preferably lauryl; and where q in the above formula is from 0.5 to 3, most preferably from 2.5 to 3.5.

Other preferred alkyl ether sulfate surfactants include where R is a $C_{16}$-$C_{18}$ alkyl chain, most preferably a monounsaturated $C_{16}$-$C_{18}$ alkyl chain; and where q in the above formula is from 5 to 15, most preferably from 6 to 12.

Other preferred anionic surfactants include internal olefin sulfonates. An internal olefin sulfonate molecule is an alkene or hydroxyalkane which contains one or more sulfonate groups. The sulfonate group is non-terminal. Such materials are discussed in EP 3 162 872 A1.

Other preferred anionic surfactants include alpha olefin sulfonates. Alpha olefin suflonate is a mixture of long chain sulfonate salts prepared by the sulfonation of alpha olefins. Alpha olefin sulfonates have a terminal sulfonate group. Preferred alpha olefin sulfonates include sodium C12-C18 alpha olefin sulfonates.

Other preferred anionic surfactants include soaps. Preferred soaps include C10-C20, preferably C12-C18 fatty acids neutralised with a suitable counterion, for example, sodium, potassium or ammonium, preferably sodium.

Other preferred anionic surfactants include anionically modified alkyl polyglucosides (APGs) (for example Suganate ex Colonial Chemical).

Other preferred anionic surfactants include anionic furan type surfactants, such as those disclosed in PCT/EP2020/061701 (unpublished at time of filing), WO15/84813, WO17/79718 and WO17/79719.

Other preferred anionic surfactants include any biosurfactant that has anionic character, for example sophorolipids, trehalolipid and rhamnolipids. Preferable are the mono-rhamnolipids and di-rhamnolipids. The preferred alkyl chain length is from $C_8$ to $C_{12}$. The alkyl chain may be saturated or unsaturated. Preferably the rhamnolipid is a di-rhamnolipid of formula:

$$Rha2C_{8\text{-}12}C_{8\text{-}12}.$$

Other preferred anionic surfactants include citrem, tatem, and datem. These are described in WO2020/058088 (Unilever), Hasenhuettl, G. L and Hartel, R. W. (Eds) Food Emulsifiers and Their Application 2008 (Springer) and in Whitehurst, R. J. (Ed) Emulsifiers in Food Technology 2008 (Wiley-VCH). Monoglyceride based Datems with 1 to 2 diacetyl tartaric acid units per mole surfactant are most preferred.

More preferably, the other anionic surfactant is selected from primary alkyl sulfates, linear alkyl benzene sulfonates, alkyl ether sulfates, furan based anionics, and rhamnolipids.

Alkyl Hydroxsultaine

The hydroxy sultaine cosurfactant will have the formula $$R—N^+(CH_3)_2—CH_2—CH(OH)—CH_2—SO_3^-M^+$$

Where R is an alkyl chain with C10-C18 and M is any suitable cationic counterion e.g. $Na^+$, $K^+$. Suitable commercial materials are Cola Teric LHS (ex Colonial Chem) and Mackam LHS (ex Solvay).

Preferably the weight ratio of secondary alkane sulfonate to alkyl hydroxysultaine co-surfactant is from 10:1 to 1.5:1, preferably from 9:1 to 2:1, more preferably from 8:1 to 5:2.

Preferred Source of Alkyl Chains Used in the Surfactants

With the exception of biosurfactants, many commercial surfactants are derived from fatty alcohol precursors. Accordingly, forming the linear alcohol is a central step in obtaining many commercial surfactants.

The linear alcohols which are suitable as an intermediate step in the manufacture of surfactants such as APGs and alcohol ethoxylates can be obtained from many different sustainable sources. These include:

Primary Sugars

Primary sugars are obtained from cane sugar or sugar beet, etc., and may be fermented to from bioethanol. The bioethanol is then dehydrated to form bio-ethylene which then can then be converted to olefins by processes such as the Shell Higher Olefin Process or the Chevron Phillips Full Range process. These alkenes can then processed into linear alcohols by hydroformylation followed by hydrogenation.

Alternatively, the ethylene can be converted directly to the fatty alcohol via the Ziegler process.

An alternative process also using primary sugars to form linear alcohols can be used and where the primary sugar undergoes microbial conversion by algae to form triglycerides. These triglycerides are then hydrolysed to linear fatty acids and which are then reduced to form the linear alcohols.

Biomass

Biomass, for example forestry products, rice husks and straw to name a few may be processed into syngas [Synthesis Gas] by gasification. Through a Fischer Tropsch reaction these are processed into alkanes, which in turn are dehydrogenated to form olefins. T hese olefins may be processed in the same manner as the alkenes described above [primary sugars].

An alternative process turns the same biomass into polysaccharides by steam explosion which may be enzymatically degraded into secondary sugars. These secondary sugars are then fermented to form bioethanol which in turn is dehydrated to form bio-ethylene. This bio-ethylene is then processed into linear alcohols as described above [primary sugars].

Waste Plastics

Waste plastic is pyrolyzed to form pyrolysis oil. This is then fractioned to form linear alkanes which are dehydrogenated to form alkenes. These alkenes are processed as described above [primary sugars].

Alternatively, the pyrolyzed oils are cracked to form ethylene which is then processed to form the required alkenes by the same processes described above in [primary sugars]. The lkenes are then processed into linear alcohols as described above [primary sugars].

MSW (Municipal Solid Waste)

MSW is turned into syngas by gasification. From syngas it may be processed to alkanes as described above [Biomass] or it may be converted into ethanol by enzymatic processes (e.g. Lanzatech process) before being dehydrogenated into ethylene. The ethylene may then be turned into linear alcohols by the processes described above [primary sugars].

Syngas can also be converted to methanol and then on to ethylene. At which point the processes described in [primary sugars] convert it to the final fatty alcohol.

The MSW may also be turned into pyrolysis oil by gasification and then fractioned to form alkanes. These alkanes are then dehydrogenated to form olefins and then linear alcohols.

Equally, the organic fraction of MSW contains polysaccharides which can be broken down enzymatically into sugars. At which point they can be fermented to ethanol, dehydrated to ethylene and converted to the fatty alcohol via routes described above.

Marine Carbon

There are various carbon sources from marine flora such as seaweed and kelp. From such marine flora the triglycerides can be separated from the source and which is then hydrolysed to form the fatty acids which are reduced to linear alcohols in the usual manner.

Alternatively, the raw material can be separated into polysaccharides which are enzymatically degraded to form secondary sugars. These may be fermented to form bio-ethanol and then processed as described above [Primary Sugars].

Waste Oils

Waste oils such as used cooking oil can be physically separated into the triglycerides which are split to form linear fatty acids and then linear alcohols as described above.

Alternatively, the used cooking oil may be subjected to the Neste Process whereby the oil is catalytically cracked to form bio-ethylene. This is then processed as described above [primary sugars].

Further Preferred Ingredients

Additional Surfactants

The composition may comprise additional surfactant other than surfactants (a), (b) and (c).

Additional surfactants may include nonionic surfactants.

Preferably the total amount of additional surfactants other than specified as surfactants (a), (b) and (c) in claim 1, in a composition of the invention ranges from 0.5 to 20 wt. %, more preferably from 1 to 16 wt. %, even more preferably from 1.5 to 12 wt. %, most preferably from 2 to 10 wt. %.

Preferably, the composition comprises from 0.5 to 20 wt. %, more preferably from 1 to 16 wt. %, even more preferably from 1.5 to 12 wt. %, most preferably from 2 to 10 wt. % of nonionic surfactants. Preferred nonionic surfactants are preferably selected from alcohol ethoxylates having from C12-C15 with a mole average of from 5 to 9 ethoxylates and/or alcohol ethoxylates having from C16-C18 with a mole average of from 7 to 14 ethoxylates.

Cleaning Boosters

The composition preferably comprises from 0.5 to 15 wt. %, more preferably from 0.75 to 15 wt. %, even more preferably from 1 to 12 wt. %, most preferably from 1.5 to 10 wt. % of cleaning boosters selected from antiredeposition polymers; soil release polymers; alkoxylated polycarboxylic acid esters as described in WO/2019/008036 and WO/2019/007636; and mixtures thereof.

Antiredeposition Polymers

Preferred antiredeposition polymers include alkoxylated polyamines.

A preferred alkoxylated polyamine comprises an alkoxylated polyethylenimine, and/or alkoxylated polypropylenimine. The polyamine may be linear or branched. It may be branched to the extent that it is a dendrimer. The alkoxylation may typically be ethoxylation or propoxylation, or a mixture of both. Where a nitrogen atom is alkoxylated, a preferred average degree of alkoxylation is from 10 to 30, preferably from 15 to 25. A preferred material is ethoxylated polyethyleneimine, with an average degree of ethoxylation being from 10 to 30 preferably from 15 to 25, where a nitrogen atom is ethoxylated.

Soil Release Polymer

Preferably the soil release polymer is a polyester soil release polymer.

Preferred soil release polymers include those described in WO 2014/029479 and WO 2016/005338.

Preferably the polyester based soil release polymer is a polyester according to the following formula (I)

(I)

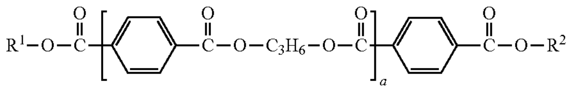

wherein

- $R^1$ and $R^2$ independently of one another are X—$(OC_2H_4)_n$—$(OC_3H_6)_m$ wherein X is $C_{1-4}$ alkyl and preferably methyl, the —$(OC_2H_4)$ groups and the —$(OC_3H_6)$ groups are arranged blockwise and the block consisting of the —$(OC_3H_6)$ groups is bound to a COO group or are HO—$(C_3H_6)$, and preferably are independently of one another X—$(OC_2H_4)_n$—$(OC_3H_6)_m$,
- n is based on a molar average number of from 12 to 120 and preferably of from 40 to 50,
- m is based on a molar average number of from 1 to 10 and preferably of from 1 to 7, and
- a is based on a molar average number of from 4 to 9.

Preferably the polyester provided as an active blend comprising:

- A) from 45 to 55% by weight of the active blend of one or more polyesters according to the following formula (I)

(I)

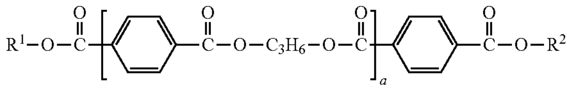

wherein

- $R^1$ and $R^2$ independently of one another are X—$(OCH_4)_n$—$(OC_3H_6)_m$ wherein X is $C_{1-4}$ alkyl and preferably methyl, the —$(OC_2H_4)$ groups and the —$(OC_3H_6)$ groups are arranged blockwise and the block consisting of the $—(OC_3H_6)$ groups is bound to a COO group or are $HO—(C_3H_6)$, and preferably are independently of one another $X—(OC_2H_4)_n—(OC_3H_6)_m$, n is based on a molar average number of from 12 to 120 and preferably of from 40 to 50, m is based on a molar average number of from 1 to 10 and preferably of from 1 to 7, and a is based on a molar average number of from 4 to 9 and B) from 10 to 30% by weight of the active blend of one or more alcohols selected from the group consisting of ethylene glycol, 1,2-propylene glycol, 1,3-propylene glycol, 1,2-butylene glycol, 1,3-butylene glycol, 1,4-butylene glycol and butyl glycol and C) from 24 to 42% by weight of the active blend of water.

Alkoxylated Polycarboxylic Acid Esters

Alkoxylated polycarboxylic acid esters are obtainable by first reacting an aromatic polycarboxylic acid containing at least three carboxylic acid units or anhydrides derived therefrom, preferably an aromatic polycarboxylic acid containing three or four carboxylic acid units or anhydrides derived therefrom, more preferably an aromatic polycarboxylic acid containing three carboxylic acid units or anhydrides derived therefrom, even more preferably trimellitic acid or trimellitic acid anhydride, most preferably trimellitic acid anhydride, with an alcohol alkoxylate and in a second step reacting the resulting product with an alcohol or a mixture of alcohols, preferably with C16/C18 alcohol.

Enzymes

Preferably enzymes, such as lipases, proteases, alpha-amylases, cellulases, peroxidases/oxidases, pectate lyases, and mannanases, or mixtures thereof, may be present in the formulation.

If enzymes are present, then preferably they are selected from: lipases, proteases, alpha-amylases, cellulases and mixtures thereof.

If present, then the level of each enzyme in the laundry composition of the invention is from 0.0001 wt. % to 0.1 wt. %.

Levels of enzyme present in the composition preferably relate to the level of enzyme as pure protein.

Suitable lipases include those of bacterial or fungal origin. Chemically modified or protein engineered mutants are included. Examples of useful lipases include lipases from *Humicola* (synonym *Thermomyces*), e.g. from *H. lanuginosa* (*T. lanuginosus*) as described in EP 258 068 and EP 305 216 or from *H. insolens* as described in WO 96/13580, a *Pseudomonas* lipase, e.g. from *P. alcaligenes* or *P. pseudoalcaligenes* (EP 218 272), *P. cepacia* (EP 331 376), *P. stutzeri* (GB 1,372,034), *P. fluorescens, Pseudomonas* sp. strain SD 705 (WO 95/06720 and WO 96/27002), *P. wisconsinensis* (WO 96/12012), a *Bacillus lipase,* e.g. from *B. subtilis* (Dartois et al. (1993), Biochemica et Biophysica Acta, 1131, 253-360), *B. stearothermophilus* (JP 64/744992) or *B. pumilus* (WO 91/16422). Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202, WO 00/60063.

Preferred commercially available lipase enzymes include Lipolase™ and Lipolase Ultra™, Lipex™ and Lipoclean™ (Novozymes A/S).

The invention may be carried out in the presence of phospholipase classified as EC 3.1.1.4 and/or EC 3.1.1.32. As used herein, the term phospholipase is an enzyme which has activity towards phospholipids.

Phospholipids, such as lecithin or phosphatidylcholine, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes which participate in the hydrolysis of phospholipids. Several types of phospholipase activity can be distinguished, including phospholipases $A_1$ and $A_2$ which hydrolyze one fatty acyl group (in the sn-1 and sn-2 position, respectively) to form lysophospholipid; and lysophospholipase (or phospholipase B) which can hydrolyze the remaining fatty acyl group in lysophospholipid. Phospholipase C and phospholipase D (phosphodiesterases) release diacyl glycerol or phosphatidic acid respectively.

Protease enzymes hydrolyse bonds within peptides and proteins, in the laundry context this leads to enhanced removal of protein or peptide containing stains. Examples of suitable proteases families include aspartic proteases; cysteine proteases; glutamic proteases; aspargine peptide lyase; serine proteases and threonine proteases. Such protease families are described in the MEROPS peptidase database (http://merops.sanger.ac.uk/). Serine proteases are preferred. Subtilase type serine proteases are more preferred. The term "subtilases" refers to a sub-group of serine protease according to Siezen et al., Protein Engng. 4 (1991) 719-737 and Siezen et al. Protein Science 6 (1997) 501 -523. Serine proteases are a subgroup of proteases characterized by having a serine in the active site, which forms a covalent adduct with the substrate. The subtilases may be divided into 6 sub-divisions, i.e. the Subtilisin family, the Thermitase family, the Proteinase K family, the Lantibiotic peptidase family, the Kexin family and the Pyrolysin family.

Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin lentus, subtilisin Novo, subtilisin Carlsberg, *Bacillus licheniformis,* subtilisin BPN', subtilisin 309, subtilisin 147 and subtilisin 168 described in WO 89/06279 and protease PD138 described in (WO 93/18140). Other useful proteases may be those described in WO 92/175177, WO 01/016285, WO 02/026024 and WO 02/016547. Examples of trypsin-like proteases are trypsin (e.g. of porcine or bovine origin) and the Fusarium protease described in WO 89/06270, WO 94/25583 and WO 05/040372, and the chymotrypsin proteases derived from Cellumonas described in WO 05/052161 and WO 05/052146.

Most preferably the protease is a subtilisins (EC 3.4.21.62).

Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin lentus, subtilisin Novo, subtilisin Carlsberg, *Bacillus licheniformis,* subtilisin BPN', subtilisin 309, subtilisin 147 and subtilisin 168 described in WO89/06279 and protease PD138 described in (WO93/18140). Preferably the subsilisin is derived from *Bacillus,* preferably *Bacillus lentus, B. alkalophilus, B. subtilis, B. amyloliquefaciens, Bacillus pumilus* and *Bacillus gibsonii* as described in U.S. Pat. Nos. 6,312,936 BI, 5,679,630, 4,760,025, 7,262,042 and WO 09/021867. Most preferably the subtilisin is derived from *Bacillus gibsonii* or *Bacillus Lentus.*

Suitable commercially available protease enzymes include those sold under the trade names names Alcalase®, Blaze®; Duralase™, Durazym™, Relase®, Relase® Ultra, Savinase®, Savinase® Ultra, Primase®, Polarzyme®, Kannase®, Liquanase®, Liquanase® Ultra, Ovozyme®, Coronase®, Coronase® Ultra, Neutrase®, Everlase® and Esperase® all could be sold as Ultra® or Evity® (Novozymes A/S).

The invention may use cutinase, classified in EC 3.1.1.74. The cutinase used according to the invention may be of any origin. Preferably cutinases are of microbial origin, in particular of bacterial, of fungal or of yeast origin.

Suitable amylases (alpha and/or beta) include those of bacterial or fungal origin. Chemically modified or protein engineered mutants are included. Amylases include, for example, alpha-amylases obtained from *Bacillus*, e.g. a special strain of *B. licheniformis*, described in more detail in GB 1,296,839, or the *Bacillus* sp. strains disclosed in WO 95/026397 or WO 00/060060. Commercially available amylases are Duramyl™, Termamyl™, Termamyl Ultra™, Natalase™, Stainzyme™, Fungamyl™ and BAN™ (Novozymes A/S), Rapidase™ and Purastar™ (from Genencor International Inc.).

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium,* e.g. the fungal cellulases produced from *Humicola insolens, Thielavia terrestris, Myceliophthora thermophila,* and *Fusarium oxysporum* disclosed in U.S. Pat. Nos. 4,435,307, 5,648,263, 5,691,178, 5,776,757, WO 89/09259, WO 96/029397, and WO 98/012307. Commercially available cellulases include Celluzyme™, Carezyme™, Celluclean™, Endolase™ Renozyme™ (Novozymes A/S), Clazinase™ and Puradax HA™ (Genencor International Inc.), and KAC-500(B)™ (Kao Corporation). Celluclean™ is preferred.

Suitable peroxidases/oxidases include those of plant, bacterial or fungal origin. Chemically modified or protein engineered mutants are included. Examples of useful peroxidases include peroxidases from *Coprinus,* e.g. from *C. cinereus,* and variants thereof as those described in WO 93/24618, WO 95/10602, and WO 98/15257. Commercially available peroxidases include Guardzyme™ and Novozym™ 51004 (Novozymes A/S).

Further enzymes suitable for use are discussed in WO 2009/087524, WO 2009/090576, WO 2009/107091, WO 2009/111258 and WO 2009/148983.

Enzyme Stabilizers

Any enzyme present in the composition may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

Further Ingredients

The formulation may contain further ingredients.

Builders or Complexing Agents

The composition may comprise a builder or a complexing agent.

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate and organic sequestrants, such as ethylene diamine tetra-acetic acid.

The composition may also contain 0-10 wt. % of a builder or complexing agent such as ethylenediaminetetraacetic acid, diethylenetriamine-pentaacetic acid, citric acid, alkyl- or alkenylsuccinic acid, nitrilotriacetic acid or the other builders mentioned below.

More preferably the laundry detergent formulation is a non-phosphate built laundry detergent formulation, i.e., contains less than 1 wt. % of phosphate. Most preferably the laundry detergent formulation is not built i.e. contain less than 1 wt. % of builder.

If the detergent composition is an aqueous liquid laundry detergent it is preferred that mono propylene glycol or glycerol is present at a level from 1 to 30 wt. %, most preferably 2 to 18 wt. %, to provide the formulation with appropriate, pourable viscosity.

Fluorescent Agent

The composition preferably comprises a fluorescent agent (optical brightener).

Fluorescent agents are well known and many such fluorescent agents are available commercially. Usually, these fluorescent agents are supplied and used in the form of their alkali metal salts, for example, the sodium salts.

The total amount of the fluorescent agent or agents used in the composition is generally from 0.0001 to 0.5 wt. %, preferably 0.005 to 2 wt. %, more preferably 0.01 to 0.1 wt. %. Preferred classes of fluorescer are: Di-styryl biphenyl compounds, e.g. Tinopal (Trade Mark) CBS-X, Di-amine stilbene di-sulphonic acid compounds, e.g. Tinopal DMS pure Xtra and Blankophor (Trade Mark) HRH, and Pyrazoline compounds, e.g. Blankophor SN. Preferred fluorescers are fluorescers with CAS-No 3426-43-5; CAS-No 35632-99-6; CAS-No 24565-13-7; CAS-No 12224-16-7; CAS-No 13863-31-5; CAS-No 4193-55-9; CAS-No 16090-02-1; CAS-No 133-66-4; CAS-No 68444-86-0; CAS-No 27344-41-8.

Most preferred fluorescers are: sodium 2 (4-styryl-3-sulfophenyl)-2H-napthol[1,2-d]triazole, disodium 4,4'-bis{[(4-anilino-6-(N methyl-N-2 hydroxyethyl) amino 1,3,5-triazin-2-yl)]amino}stilbene-2-2' disulphonate, disodium 4,4'-bis{[(4-anilino-6-morpholino-1,3,5-triazin-2-yl)]amino} stilbene-2-2' disulphonate, and disodium 4,4'-bis(2-sulphostyryl)biphenyl.

Shading Dye

It is advantageous to have shading dye present in the formulation.

Dyes are described in Color *Chemistry Synthesis, Properties and Applications of Organic Dyes and Pigments,* (H Zollinger, Wiley VCH, Zürich, 2003) and, Industrial Dyes Chemistry, Properties Applications. (K Hunger (ed), Wiley-VCH Weinheim 2003).

Dyes for use in laundry detergents preferably have an extinction coefficient at the maximum absorption in the visible range (400 to 700nm) of greater than 5000 L $mol^{-1}$ $cm^{-1}$, preferably greater than 10000 L $mol^{-1}$ $cm^{-1}$.

Preferred dye chromophores are azo, azine, anthraquinone, phthalocyanine and triphenylmethane. Azo, anthraquinone, phthalocyanine and triphenylmethane dyes preferably carry a net anionic charged or are uncharged. Azine dyes preferably carry a net anionic or cationic charge.

Blue or violet Shading dyes are most preferred. Shading dyes deposit to fabric during the wash or rinse step of the washing process providing a visible hue to the fabric. In this regard the dye gives a blue or violet colour to a white cloth with a hue angle of 240 to 345, more preferably 260 to 320, most preferably 270 to 300. The white cloth used in this test is bleached non-mercerised woven cotton sheeting.

Shading dyes are discussed in WO 2005/003274, WO 2006/032327 (Unilever), WO 2006/032397 (Unilever), WO 2006/045275 (Unilever), WO 2006/027086 (Unilever), WO 2008/017570 (Unilever), WO 2008/141880 (Unilever), WO 2009/132870 (Unilever), WO 2009/141173 (Unilever), WO 2010/099997 (Unilever), WO 2010/102861 (Unilever), WO 2010/148624 (Unilever), WO 2008/087497 (P&G), WO 2011/011799 (P&G), WO 2012/054820 (P&G), WO 2013/142495 (P&G), WO 2013/151970 (P&G), WO 2018/085311 (P&G) and WO 2019/075149 (P&G).

A mixture of shading dyes may be used.

The shading dye chromophore is most preferably selected from mono-azo, bis-azo and azine.

Mono-azo dyes preferably contain a heterocyclic ring and are most preferably thiophene dyes. The mono-azo dyes are preferably alkoxylated and are preferably uncharged or anionically charged at pH=7. Alkoxylated thiophene dyes are discussed in WO2013/142495 and WO2008/087497. A preferred example of a thiophene dye is shown below:

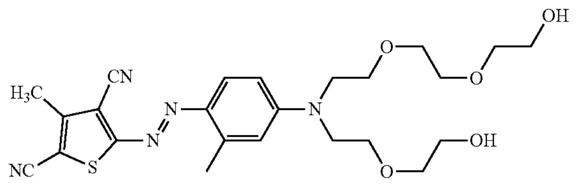 [SMILES: Cc1cc(N(CCOCCO)CCOCCOCCO)ccc1/N=N/c1sc(C#N)c(C)c1C#N]

Bis-azo dyes are preferably sulphonated bis-azo dyes. Preferred examples of sulphonated bis-azo compounds are direct violet 7, direct violet 9, direct violet 11, direct violet 26, direct violet 31, direct violet 35, direct violet 40, direct violet 41, direct violet 51, direct violet 66, direct violet 99 and alkoxylated versions thereof.

Alkoxylated bis-azo dyes are discussed in WO2012/054058 and WO/2010/151906.

An example of an alkoxylated bis-azo dye is:

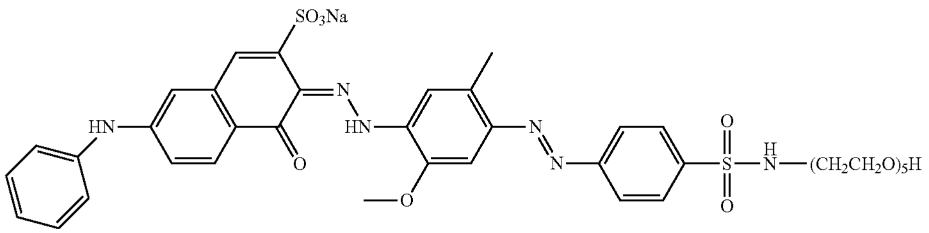

Azine dyes are preferably selected from sulphonated phenazine dyes and cationic phenazine dyes. Preferred examples are acid blue 98, acid violet 50, dye with CAS-No 72749-80-5, acid blue 59, and the phenazine dye selected from:

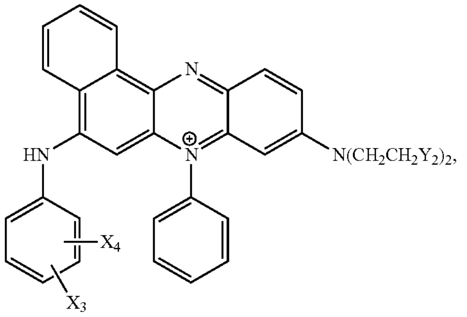

wherein:

$X_3$ is selected from: —H; —F; —$CH_3$; —$C_2H_5$; —$OCH_3$; and, —$OC_2H_5$;

$X_4$ is selected from: —H; —$CH_3$; —$C_2H_5$; —$OCH_3$; and, —$OC_2H_5$;

$Y_2$ is selected from: —OH; —$OCH_2CH_2OH$; —CH(OH)$CH_2OH$; —OC(O)$CH_3$; and, C(O)$OCH_3$.

Anthraquinone dyes covalently bound to ethoxylate or propoxylated polyethylene imine may be used as described in WO2011/047987 and WO 2012/119859.

The shading dye is preferably present is present in the composition in range from 0.0001 to 0.1wt %. Depending upon the nature of the shading dye there are preferred ranges depending upon the efficacy of the shading dye which is dependent on class and particular efficacy within any particular class. As stated above the shading dye is preferably a blue or violet shading dye.

Perfume

The composition preferably comprises a perfume. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co.

Preferably the perfume comprises at least one note (compound) from: alpha-isomethyl ionone, benzyl salicylate; citronellol; coumarin; hexyl cinnamal; linalool; pentanoic acid, 2-methyl-, ethyl ester; octanal; benzyl acetate; 1,6-octadien-3-ol, 3,7-dimethyl-, 3-acetate; cyclohexanol, 2-(1, 1-dimethylethyl)-, 1-acetate; delta-damascone; beta-ionone; verdyl acetate; dodecanal; hexyl cinnamic aldehyde; cyclopentadecanolide; benzeneacetic acid, 2-phenylethyl ester; amyl salicylate; beta-caryophyllene; ethyl undecylenate; geranyl anthranilate; alpha-irone; beta-phenyl ethyl benzoate; alpa-santalol; cedrol; cedryl acetate; cedry formate; cyclohexyl salicyate; gamma-dodecalactone; and, beta phenylethyl phenyl acetate.

Useful components of the perfume include materials of both natural and synthetic origin. They include single compounds and mixtures. Specific examples of such components may be found in the current literature, e.g., in Fenaroli's Handbook of Flavour Ingredients, 1975, CRC Press; Synthetic Food Adjuncts, 1947 by M. B. Jacobs, edited by Van Nostrand; or Perfume and Flavour Chemicals by S. Arctander 1969, Montclair, N.J. (USA).

It is commonplace for a plurality of perfume components to be present in a formulation. In the compositions of the present invention it is envisaged that there will be four or more, preferably five or more, more preferably six or more or even seven or more different perfume components.

In perfume mixtures preferably 15 to 25 wt. % are top notes. Top notes are defined by Poucher (Journal of the Society of Cosmetic Chemists 6(2):80 [1955]). Preferred top-notes are selected from citrus oils, linalool, linalyl acetate, lavender, dihydromyrcenol, rose oxide and cis-3-hexanol.

The International Fragrance Association has published a list of fragrance ingredients (perfumes) in 2011. (http://www.ifraorq.org/en-us/inqredients#.U7Z4hPldWzk) The Research Institute for Fragrance Materials provides a database of perfumes (fragrances) with safety information.

Perfume top note may be used to cue the whiteness and brightness benefit of the invention. Some or all of the perfume may be encapsulated, typical perfume components which it is advantageous to encapsulate, include those with a relatively low boiling point, preferably those with a boiling point of less than 300, preferably 100-250 Celsius. It is also advantageous to encapsulate perfume components which have a low CLog P (ie. those which will have a greater tendency to be partitioned into water), preferably with a CLog P of less than 3.0. These materials, of relatively low boiling point and relatively low CLog P have been called the "delayed blooming" perfume ingredients and include one or more of the following materials: allyl caproate, amyl acetate, amyl propionate, anisic aldehyde, anisole, benzaldehyde, benzyl acetate, benzyl acetone, benzyl alcohol, benzyl formate, benzyl iso valerate, benzyl propionate, beta gamma hexenol, camphor gum, laevo-carvone, d-carvone, cinnamic alcohol, cinamyl formate, cis-jasmone, cis-3-hexenyl acetate, cuminic alcohol, cyclal c, dimethyl benzyl carbinol, dimethyl benzyl carbinol acetate, ethyl acetate, ethyl aceto acetate, ethyl amyl ketone, ethyl benzoate, ethyl butyrate, ethyl hexyl ketone, ethyl phenyl acetate, eucalyptol, eugenol, fenchyl acetate, flor acetate (tricyclo decenyl acetate), frutene (tricycico decenyl propionate), geraniol, hexenol, hexenyl acetate, hexyl acetate, hexyl formate, hydratropic alcohol, hydroxycitronellal, indone, isoamyl alcohol, iso menthone, isopulegyl acetate, isoquinolone, ligustral, linalool, linalool oxide, linalyl formate, menthone, menthyl acetphenone, methyl amyl ketone, methyl anthranilate, methyl benzoate, methyl benyl acetate, methyl eugenol, methyl heptenone, methyl heptine carbonate, methyl heptyl ketone, methyl hexyl ketone, methyl phenyl carbinyl acetate, methyl salicylate, methyl-n-methyl anthranilate, nerol, octalactone, octyl alcohol, p-cresol, p-cresol methyl ether, p-methoxy acetophenone, p-methyl acetophenone, phenoxy ethanol, phenyl acetaldehyde, phenyl ethyl acetate, phenyl ethyl alcohol, phenyl ethyl dimethyl carbinol, prenyl acetate, propyl bornate, pulegone, rose oxide, safrole, 4-terpinenol, alpha-terpinenol, and/or viridine. It is commonplace for a plurality of perfume components to be present in a formulation. In the compositions of the present invention it is envisaged that there will be four or more, preferably five or more, more preferably six or more or even seven or more different perfume components from the list given of delayed blooming perfumes given above present in the perfume.

Another group of perfumes with which the present invention can be applied are the so-called 'aromatherapy' materials. These include many components also used in perfumery, including components of essential oils such as Clary Sage, Eucalyptus, Geranium, Lavender, Mace Extract, Neroli, Nutmeg, Spearmint, Sweet Violet Leaf and Valerian.

It is preferred that the laundry treatment composition does not contain a peroxygen bleach, e.g., sodium percarbonate, sodium perborate, and peracid.

Polymers

The composition may comprise one or more further polymers. Examples are carboxymethylcellulose, poly (ethylene glycol), poly(vinyl alcohol), polycarboxylates such as polyacrylates, maleic/acrylic acid copolymers and lauryl methacrylate/acrylic acid copolymers.

Where alkyl groups are sufficiently long to form branched or cyclic chains, the alkyl groups encompass branched, cyclic and linear alkyl chains. The alkyl groups are preferably linear or branched, most preferably linear.

Adjunct Ingredients

The detergent compositions optionally include one or more laundry adjunct ingredients.

To prevent oxidation of the formulation an anti-oxidant may be present in the formulation.

The term "adjunct ingredient" includes: perfumes, dispersing agents, stabilizers, pH control agents, metal ion control agents, colorants, brighteners, dyes, odour control agent, pro-perfumes, cyclodextrin, perfume, solvents, soil release polymers, preservatives, antimicrobial agents, chlorine scavengers, anti-shrinkage agents, fabric crisping agents, spotting agents, anti-oxidants, anti-corrosion agents, bodying agents, drape and form control agents, smoothness agents, static control agents, wrinkle control agents, sanitization agents, disinfecting agents, germ control agents, mould control agents, mildew control agents, antiviral agents, antimicrobials, drying agents, stain resistance agents, soil release agents, malodour control agents, fabric refreshing agents, chlorine bleach odour control agents, dye fixatives, dye transfer inhibitors, shading dyes, colour maintenance agents, colour restoration, rejuvenation agents, anti-fading agents, whiteness enhancers, anti-abrasion agents, wear resistance agents, fabric integrity agents, anti-wear agents, and rinse aids, UV protection agents, sun fade inhibitors, insect repellents, anti-allergenic agents, enzymes, flame retardants, water proofing agents, fabric comfort agents, water conditioning agents, shrinkage resistance agents, stretch resistance agents, and combinations thereof. If present, such adjuncts can be used at a level of from 0.1% to 5% by weight of the composition The invention will be further described with the following non-limiting examples.

EXAMPLES

The following surfactant solutions were generated and tested for cleaning against a dyed beef fat monitor (CS61 on cotton ex Equest).

High Throughput (HT) Cleaning Protocol

Stained discs of fabric (stained with dyed Beef Fat) are placed into the wells of a 96-well microtitre plate and their colour is measured via imaging and image analysis software which calculates the before wash (Bw) CIEL*a*b* colour values for each cloth. Formulations are deposited into each of the wells based on the experimental design.

The core surfactant concentration (i.e. excluding the co-surfactants Amine Oxide or Lauryl Hydroxy Sultaine (LHS)) is always fixed at 0.2 g/L. Where these co-surfactants have been added, they are included at 0.02 g/L (i.e. at a 10:1 ratio with the other core surfactants). So while there is slightly more (10%) surfactant in the Amine Oxide and LHS formulation tests, the level of surfactant is equal between the Amine Oxide compared with the LHS test formulations.

Multiple repeats (six) of each formulation are run to reduce the size of the error in the process and allow good statistical discrimination to be found. The plates are then agitated at 20° C. for 30 minutes. On completion, the wash liquor is removed, and the stained fabrics are rinsed three times in water within the MTP wells. Following drying for 4 hours at 55° C. the plates are then measured again to calculate the after wash (Aw) CIEL*a*b* colour values for each cloth.

Delta EAw-Bw is calculated according to the equation where:

$$\text{Delta } E_{Aw-BW}=\text{SQRT}((L^*_{Aw}-L^*_{Bw})^2)+((a^*_{Aw}-a^*_{Bw})^2)+((b^*_{Aw}-b^*_{Bw})^2)).$$

These are the cleaning score values expressed in the tables that follow.

All concentrations are expressed as g/L (grams per litre).

Explanations of the Surfactants Used

SAS=Secondary Alkane Sulphonate (WeylClean SAS60 ex Weylchem)

PAS=Primary Alky Sulphate (Stepanol WA-90 ex Stepan)

SLES 3EO=Sodium Lauryl Ether Sulphate modified with an average of three ethoxy units (Steol CS-370 ex Stepan)

LAS=Linear alkyl benzene sulphonates (Nansa HS85S ex Innospec)

Rhamno R2=Rhamnolipid mixture rich in di-rhamnolipid R2 (mixture containing >70 wt. % of di-rhamnolipid $Rha2C_{8-12}C_{8-12}$, sourced from Evonik)

C12 Furan had the structure:

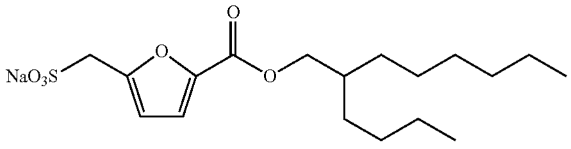

LHS=Lauryl Hydroxysultaine (Mackam LHS ex Solvay)

Amine Oxide=Amine Oxide (Empigen OB ex Innospec)

Example 1

The following results are HT (high throughput) measurements where the ratio of the SAS surfactant to second anionic surfactant is 3:1.

| SAS g/L | PAS g/L | SLES 3EO g/L | LAS g/L | Rhamno R2 g/L | C12 Furan g/L | LHS g/L | Amine Oxide g/L | Cleaning Score |
|---|---|---|---|---|---|---|---|---|
| 0.15 | 0.05 | | | | | | | 1.71 |
| 0.15 | 0.05 | | | | | 0.02 | | 9.67 |
| 0.15 | 0.05 | | | | | | 0.02 | 7.91 |
| 0.15 | | 0.05 | | | | | | 5.99 |
| 0.15 | | 0.05 | | | | 0.02 | | 17.69 |
| 0.15 | | 0.05 | | | | | 0.02 | 11.05 |
| 0.15 | | | 0.05 | | | | | 7.89 |
| 0.15 | | | 0.05 | | | 0.02 | | 21.86 |
| 0.15 | | | 0.05 | | | | 0.02 | 12.22 |
| 0.15 | | | | 0.05 | | | | 0.51 |
| 0.15 | | | | 0.05 | | 0.02 | | 8.40 |
| 0.15 | | | | 0.05 | | | 0.02 | 9.30 |

-continued

| SAS g/L | PAS g/L | SLES 3EO g/L | LAS g/L | Rhamno R2 g/L | C12 Furan g/L | LHS g/L | Amine Oxide g/L | Cleaning Score |
|---|---|---|---|---|---|---|---|---|
| 0.15 | | | | | 0.05 | | | 7.67 |
| 0.15 | | | | | 0.05 | 0.02 | | 22.33 |
| 0.15 | | | | | 0.05 | | 0.02 | 11.49 |

| SAS g/L | PAS g/L | SLES 3EO g/L | LAS g/L | Rhamno R2 g/L | C12 Furan g/L | LHS g/L | Amine Oxide g/L | Cleaning Score |
|---|---|---|---|---|---|---|---|---|
| 0.15 | 0.05 | | | | | | | 10.11 |
| 0.15 | 0.05 | | | | | 0.02 | | 24.68 |
| 0.15 | 0.05 | | | | | | 0.02 | 14.83 |
| 0.15 | | 0.05 | | | | | | 15.57 |
| 0.15 | | 0.05 | | | | 0.02 | | 26.68 |
| 0.15 | | 0.05 | | | | | 0.02 | 20.54 |
| 0.15 | | | 0.05 | | | | | 10.08 |
| 0.15 | | | 0.05 | | | 0.02 | | 20.37 |
| 0.15 | | | 0.05 | | | | 0.02 | 12.09 |
| 0.15 | | | | 0.05 | | | | 11.75 |
| 0.15 | | | | 0.05 | | 0.02 | | 26.66 |
| 0.15 | | | | 0.05 | | | 0.02 | 19.09 |
| 0.15 | | | | | 0.05 | | | 6.50 |
| 0.15 | | | | | 0.05 | 0.02 | | 19.82 |
| 0.15 | | | | | 0.05 | | 0.02 | 9.83 |

Example 2

The following results are HT measurements where the ratio of the SAS surfactant to second anionic surfactant is 1:3.

| SAS g/L | PAS g/L | SLES 3EO g/L | LAS g/L | Rhamno R2 g/L | C12 Furan g/L | LHS g/L | Amine Oxide g/L | Cleaning Score |
|---|---|---|---|---|---|---|---|---|
| 0.05 | 0.15 | | | | | | | 4.04 |
| 0.05 | 0.15 | | | | | 0.02 | | 21.87 |
| 0.05 | 0.15 | | | | | | 0.02 | 14.42 |
| 0.05 | | 0.15 | | | | | | 2.36 |
| 0.05 | | 0.15 | | | | 0.02 | | 22.78 |
| 0.05 | | 0.15 | | | | | 0.02 | 16.37 |
| 0.05 | | | 0.15 | | | | | 11.55 |
| 0.05 | | | 0.15 | | | 0.02 | | 15.84 |
| 0.05 | | | 0.15 | | | | 0.02 | 9.23 |
| 0.05 | | | | 0.15 | | | | 13.02 |
| 0.05 | | | | 0.15 | | 0.02 | | 25.00 |
| 0.05 | | | | 0.15 | | | 0.02 | 15.69 |
| 0.05 | | | | | 0.15 | | | 10.40 |
| 0.05 | | | | | 0.15 | 0.02 | | 22.19 |
| 0.05 | | | | | 0.15 | | 0.02 | 14.06 |

| SAS g/L | PAS g/L | SLES 3EO g/L | LAS g/L | Rhamno R2 g/L | C12 Furan g/L | LHS g/L | Amine Oxide g/L | Cleaning Score |
|---|---|---|---|---|---|---|---|---|
| 0.05 | 0.15 | | | | | | | 4.37 |
| 0.05 | 0.15 | | | | | 0.02 | | 21.51 |
| 0.05 | 0.15 | | | | | | 0.02 | 13.1 |
| 0.05 | | 0.15 | | | | | | 2.59 |
| 0.05 | | 0.15 | | | | 0.02 | | 24.0 |
| 0.05 | | 0.15 | | | | | 0.02 | 11.57 |
| 0.05 | | | 0.15 | | | | | 14.37 |
| 0.05 | | | 0.15 | | | 0.02 | | 11.78 |
| 0.05 | | | 0.15 | | | | 0.02 | 10.34 |
| 0.05 | | | | 0.15 | | | | 15.33 |
| 0.05 | | | | 0.15 | | 0.02 | | 27.66 |

-continued

| SAS g/L | PAS g/L | SLES 3EO g/L | LAS g/L | Rhamno R2 g/L | C12 Furan g/L | LHS g/L | Amine Oxide g/L | Cleaning Score |
|---|---|---|---|---|---|---|---|---|
| 0.05 | | | | 0.15 | | | 0.02 | 19.38 |
| 0.05 | | | | | 0.15 | | | 14.10 |
| 0.05 | | | | | 0.15 | 0.02 | | 24.29 |
| 0.05 | | | | | 0.15 | | 0.02 | 16.20 |

The experiments thus overwhelmingly support a finding that the combination of secondary alkane sulfonate surfactant with a range of second anionic surfactants and an alkyl hydroxysultaine cosurfactant provides superior cleaning in comparison to the more common amino oxide cosurfactant, and also where the cosurfactant is absent.

The invention claimed is:

1. A detergent composition, comprising:

a) from 1 to 40 wt. % of a secondary alkane sulfonate surfactant with an average of 15 to 18 carbon atoms in a linear alkyl chain;

b) from 1 to 40 wt. % of an additional anionic surfactant other than the secondary alkane sulfonate surfactant; and, from 0.01 to 8 wt. % of an alkyl hydroxysultaine co-surfactant;

wherein greater than 50 wt. % of the linear alkyl chain of the secondary alkane sulfonate is C15 to C18 and the linear alkyl chains of the secondary alkane sulfonate surfactant are obtained from renewable sources.

2. The detergent composition according to claim 1, wherein greater than 60 wt. % of the linear alkyl chain of the secondary alkane sulfonate surfactant is C15 to C18.

3. The detergent composition according to claim 1, wherein a total weight ratio of the secondary alkane sulfonate surfactant to the additional anionic surfactant ranges from 10:1 to 1:10.

4. The detergent composition according to claim 1, wherein a weight ratio of the secondary alkane sulfonate surfactant and the additional anionic surfactant to the alkyl hydroxysultaine co-surfactant ranges from 2:1 to 100:1.

5. The detergent composition according to claim 1, wherein greater than 50 wt. %, of an alkyl chain of the alkyl hydroxysultaine co-surfactant is from C10-C16.

6. The detergent composition according to claim 1, wherein the additional anionic surfactant is selected from primary alkyl sulfates, linear alkyl benzene sulfonates, alkyl ether sulfates, internal olefin sulfonates, alpha olefin sulfonates, soaps, anionically modified APGs, furan based anionics, anionic biosurfactants and, citrems, tatems and datems.

7. The detergent composition according to claim 1, wherein the composition comprises from 0.5 to 20 wt. % of the anionic surfactant.

8. The detergent composition according to claim 1, further comprising from 0.5 to 15 wt. % of cleaning boosters selected from antiredeposition polymers, soil release polymers, alkoxylated polycarboxylic acid esters and mixtures thereof.

9. The detergent composition according to claim 8, wherein the antiredeposition polymers are alkoxylated polyamines.

10. The detergent composition according to claim 8, wherein the soil release polymer is a polyester soil release polymer.

11. The detergent composition according to claim 1, wherein the composition is a laundry detergent composition.

12. The detergent composition according to claim 1, further comprising one or more enzymes from the group: lipases, proteases, alpha-amylases, cellulases, peroxidases/oxidases, pectate lyases, and mannanases, or mixtures thereof.

13. The detergent composition according to claim 1, wherein the weight ratio of the secondary alkane sulfonate surfactant to the alkyl hydroxysultaine co-surfactant is from 10:1 to 1.5:1.

14. A method of treating a textile, comprising the step of: treating the textile with an aqueous solution of 0.5 to 20 g/L of the detergent composition of claim 1, and optionally drying the textile.

15. The detergent composition according to claim 1, wherein the linear alkyl chains of the secondary alkane sulfonate surfactant are triglycerides.

16. The detergent composition according to claim 1, wherein the additional anionic surfactant is at least one of primary alkyl sulfates, linear alkyl benzene sulfonates, alkyl ether sulfates, furan based anionics or rhamnolipids.

17. The detergent composition according to claim 6, wherein the anionic biosurfactants are rhamnolipids.

18. The detergent composition according to claim 1, wherein the composition further contains a nonionic surfactant selected from an alcohol ethoxylate having from C12-C15 with a mole average of from 5 to 9 ethoxylates or an alcohol ethoxylate having from C16-C18 with a mole average of from 7 to 14 ethoxylates.

19. The detergent composition according to claim 12, wherein a level of each of the enzymes in the composition is from 0.0001 wt. % to 0.1 wt. %.

* * * * *